United States Patent
Hara et al.

(10) Patent No.: US 8,995,730 B2
(45) Date of Patent: Mar. 31, 2015

(54) IMAGE PROCESSING APPARATUS FOR ANALYZING AND ENHANCING FINGERPRINT IMAGES

(75) Inventors: Masanori Hara, Tokyo (JP); Hiroaki Toyama, Tokyo (JP)

(73) Assignee: NEC Solutions Innovators, Ltd., Tokyo (JP)

( * ) Notice: Subject to any disclaimer, the term of this patent is extended or adjusted under 35 U.S.C. 154(b) by 307 days.

(21) Appl. No.: 13/574,198

(22) PCT Filed: Dec. 21, 2010

(86) PCT No.: PCT/JP2010/072997
§ 371 (c)(1),
(2), (4) Date: Nov. 13, 2012

(87) PCT Pub. No.: WO2011/089813
PCT Pub. Date: Jul. 28, 2011

(65) Prior Publication Data
US 2013/0051636 A1    Feb. 28, 2013

(30) Foreign Application Priority Data
Jan. 20, 2010    (JP) .................. 2010-010348

(51) Int. Cl.
*G06K 9/00* (2006.01)
*G06T 5/00* (2006.01)
(52) U.S. Cl.
CPC .......... *G06T 5/003* (2013.01); *G06K 9/00067* (2013.01); *G06T 2207/20192* (2013.01)
USPC ................... 382/124; 283/68; 356/71
(58) Field of Classification Search
None
See application file for complete search history.

(56) References Cited

U.S. PATENT DOCUMENTS

| 5,519,785 A | 5/1996 | Hara |
| 5,915,035 A * | 6/1999 | Hsiao et al. .................. 382/125 |

(Continued)

FOREIGN PATENT DOCUMENTS

| JP | 52-97298 A | 8/1977 |
| JP | 7-121723 A | 5/1995 |

(Continued)

OTHER PUBLICATIONS

Lin Hong et al., "Fingerprint Image Enhancement: Algorithm and Performance Evaluation", IEEE Transactions on Pattern Analysis and Machine Intelligence, 1998, pp. 1-30.
Michael Cannon et al., "Background pattern removal by power spectral filtering", Applied Optics, Mar. 1983, pp. 777-779, vol. 22, No. 6.
International Search Report for PCT/JP2010/072997 dated Feb. 1, 2011.

*Primary Examiner* — Randolph I Chu
(74) *Attorney, Agent, or Firm* — Sughrue Mion, PLLC

(57) ABSTRACT

An image processing apparatus includes: a data storage section configured to store image data as a density image containing a fingerprint or a palm print and ridge pattern direction distribution data which shows a direction distribution of a ridge pattern in a fingerprint or a palm print; a direction usage image enhancing section configured to execute ridge direction usage image enhancement processing on the density image based on the ridge pattern direction distribution data; and a direction extracting section configured to extract a first direction distribution of a first pattern which is contained in a ridge direction usage image enhanced image, from the ridge direction usage image enhanced image as a result of the ridge direction usage image enhancement processing to the density image. The direction usage image enhancing section executes first direction usage image enhancement processing on the density image based on first direction distribution data which shows a first direction distribution.

11 Claims, 23 Drawing Sheets

(56) References Cited

U.S. PATENT DOCUMENTS

| | | | |
|---|---|---|---|
| 2004/0125993 A1* | 7/2004 | Zhao et al. | 382/124 |
| 2006/0067566 A1* | 3/2006 | Hara | 382/124 |
| 2007/0230754 A1* | 10/2007 | Jain et al. | 382/125 |
| 2008/0298642 A1* | 12/2008 | Meenen | 382/115 |
| 2009/0169072 A1* | 7/2009 | Lo et al. | 382/125 |
| 2009/0226052 A1* | 9/2009 | Fedele et al. | 382/125 |
| 2009/0232397 A1* | 9/2009 | Hara | 382/169 |

FOREIGN PATENT DOCUMENTS

| | | |
|---|---|---|
| JP | 9-167230 A | 6/1997 |
| JP | 2002-99912 A | 4/2002 |
| JP | 2009-223562 A | 10/2009 |

\* cited by examiner

IMAGE PROCESSING APPARATUS FOR ANALYZING AND ENHANCING FINGERPRINT IMAGES

CROSS REFERENCE TO RELATED APPLICATIONS

This application is a National Stage of International Application No. PCT/JP2010/072997 filed Dec. 21, 2010, claiming priority based on Japanese Patent Application No. 2010-010348 filed Jan. 20, 2010, the contents of all of which are incorporated herein by reference in their entirety.

TECHNICAL FIELD

The present invention relates to an image processing apparatus, an image processing method, and a program, and more particularly, to an image processing apparatus, an image processing method, and a program that process a curved stripe pattern image such as a fingerprint image or a palm print image.

BACKGROUND ART

A fingerprint including a plurality of ridges like a curved stripe pattern is characterized by permanence and uniqueness. Therefore, the fingerprint has been used for criminal investigation since long ago. In particular, matching using latent fingerprints left at a crime scene is effective investigating means. In recent years, many police agencies have introduced a fingerprint matching system using a computer.

However, many of images of latent fingerprints are low quality and include noise, and therefore judgment by a judge or automatization of the judgment is difficult. The images of the latent fingerprints include: an image of overlapped fingerprints in which ridges of two fingerprints overlap with each other; and an image including blur that forms into a curved stripe pattern. If one of the overlapped fingerprints is handled as a processing target, the other one can be regarded as background noise like a curved stripe pattern. The background noise like a curved stripe pattern is hereinafter referred to as curved stripe pattern noise. The blur forming a curved stripe pattern also corresponds to the curved stripe pattern noise.

The curved stripe pattern noise is the same as a fingerprint as a processing target (a target fingerprint) in that the both have curved stripe patterns. Accordingly, it is difficult to extract only a target fingerprint from the overlapped fingerprints, or remove blur forming a curved stripe pattern to prevent a target fingerprint from deteriorating.

An image processing method related to the present invention will be described below.

Non-patent literature 1 discloses a technique that applies a Fourier transformation to remove background noise. This technique is thought to be effective when periodic noise linearly appears in one direction, but have only a limited effect for curved stripe pattern noise. For example, in a region where a direction of a ridge of a target fingerprint and a direction of curved stripe pattern noise are close to each other, not only the curved stripe pattern noise but also the ridge of the target fingerprint may disappear. Further, even a ridge of a target fingerprint in a region where there is no noise may be deteriorated.

Patent literature 1 discloses a method for obtaining a direction distribution of a stripe pattern. In this method, an operator specifies a region and a direction indicating line in an image of the stripe pattern. The direction distribution of the stripe pattern in the region is obtained on the basis of the direction indicating line.

Also, various methods that extract directions and periodicity of fingerprint ridges, and perform a filtering process suitable for the directions and periodicity to enhance the fingerprint ridges are proposed. For example, Non-patent literature 2 and Patent literature 2 disclose such a method. However, such a method is thought not to be effective when directions and periodicity of ridges of a target fingerprint cannot be accurately extracted due to the influence of curved stripe pattern noise.

On the other hand, it is known that a local image enhancement method such as an Adaptive Contract Stretch method or Adaptive Histogram Equalization method is effective in removing local background noise. In the local image enhancement method, it is important to appropriately set a reference region for image enhancement.

Patent literature 3 discloses a technique that, by executing local image enhancement to a curved stripe pattern image including target fingerprint ridges and the curved stripe pattern noise based on directions of curved stripe pattern noise, a component of the curved stripe pattern noise is removed to enhance the target fingerprint ridges. In the local image enhancement, a reference region as a local region including a pixel of the curved stripe pattern image is set so as to be along a direction of the curved stripe pattern noise at a position of the pixel, and a density value of the pixel after the local image enhancement is calculated on the basis of a density histogram of the reference region.

According to the technique in Patent literature 3, when the number of curved stripe pattern noises is one (e.g., when the curved stripe pattern image includes, in addition to a target fingerprint, only one fingerprint that overlaps with the target fingerprint), the target fingerprint ridges can be enhanced. However, when the number of curved stripe pattern noises is two or more (e.g., when the curved stripe pattern image includes, in addition to the target fingerprint, two or more fingerprints that overlap with the target fingerprint), it is impossible to enhance only the target fingerprint ridges. Further, in a region where a direction of the curved stripe pattern noise is coincide with a direction of any of the target fingerprint ridges, the target fingerprint ridge is removed by the local image enhancement based on the direction of the curved stripe pattern noise.

Patent literature 4 discloses a stripe pattern direction determining system. The stripe pattern direction determining system uses a fact that a change in density along the same direction as stripes in a stripe pattern grayscale image is small, and a change in density along a direction orthogonal to the stripes is large, and thereby obtains a direction of a stripe in a pixel of the stripe pattern grayscale image.

Patent literature 5 discloses an image processing apparatus. The image processing apparatus divides an inputted fingerprint image into a plurality of small regions, performs a two-dimensional Fourier transformation for each of the small regions, and determines a direction of a fingerprint ridge in each of the small regions on the basis of a result of the two-dimensional Fourier transformation.

CITATION LIST

Patent literature 1: JP H07-121723
Patent literature 2: JP 2002-99912A
Patent literature 3: JP 2009-223562A
Patent literature 4: JP S52-97298A
Patent literature 5: JP H09-167230A Non-patent literature 1: M. Cannon, A. Lehar, and F. Preston, "Background Pattern Removal by Power Spectral Filtering", Applied Optics, Mar. 15, 1983

Non-patent literature 2: Lin Hong, Yifei Ean, and Anil Jain, "Fingerprint Image Enhancement: Algorithm and Performance Evaluation", IEEE Transactions on Pattern Analysis and Machine Intelligence, 1998

SUMMARY OF THE INVENTION

An object of the present Invention is to provide an image processing apparatus, an image processing method and a program, in which curved ridge pattern noise is removed from a curved ridge pattern image, and at the same time, ridges of a fingerprint or palm print are enhanced.

An image processing apparatus according to a first aspect of the present invention is provided with: a data storage section configured to store image data as a density image containing a fingerprint or a palm print and ridge pattern direction distribution data which shows a direction distribution of a ridge pattern in the fingerprint or the palm print; a direction usage image enhancing section configured to execute ridge direction usage image enhancement processing on the density image based on the ridge pattern direction distribution data; and a direction extracting section configured to extract a first direction distribution of a first pattern which is contained in a ridge direction usage image enhanced image, from the ridge direction usage image enhanced image as a result of the ridge direction usage image enhancement processing to the density image. The direction usage image enhancing section executes first direction usage image enhancement processing on the density image based on first direction distribution data which shows a first direction distribution.

An image processing method according to a second aspect of the present invention is provided with: executing ridge direction usage image enhancement processing which is based on ridge pattern direction distribution data, to a density image based on image data of the density image which contains a fingerprint or a palm print and the ridge pattern direction distribution data which shows a direction distribution of a ridge pattern of the fingerprint or the palm print; extracting a first direction distribution of a first pattern which is contained in the ridge direction usage image enhanced image, from a ridge direction usage image enhanced image as a result of ridge direction usage image enhancement processing to the density image; and executing first direction usage image enhancement processing which is based on first direction distribution data which shows the first direction distribution, to the density image.

A program according to a third aspect of the present invention is provided to make a computer execute the above image processing method.

BRIEF DESCRIPTION OF DRAWINGS

The above and other objects, effects, and features of the present invention will be further clarified from description of exemplified embodiments in collaboration with accompanying drawings.

DESCRIPTION OF EXEMPLIFIED EMBODIMENTS

Hereafter, an image processing apparatus, an image processing method, and a program according to each of the exemplified embodiments of the present invention will be described with reference to the attached drawings.

First Exemplified Embodiment

Figure 1:
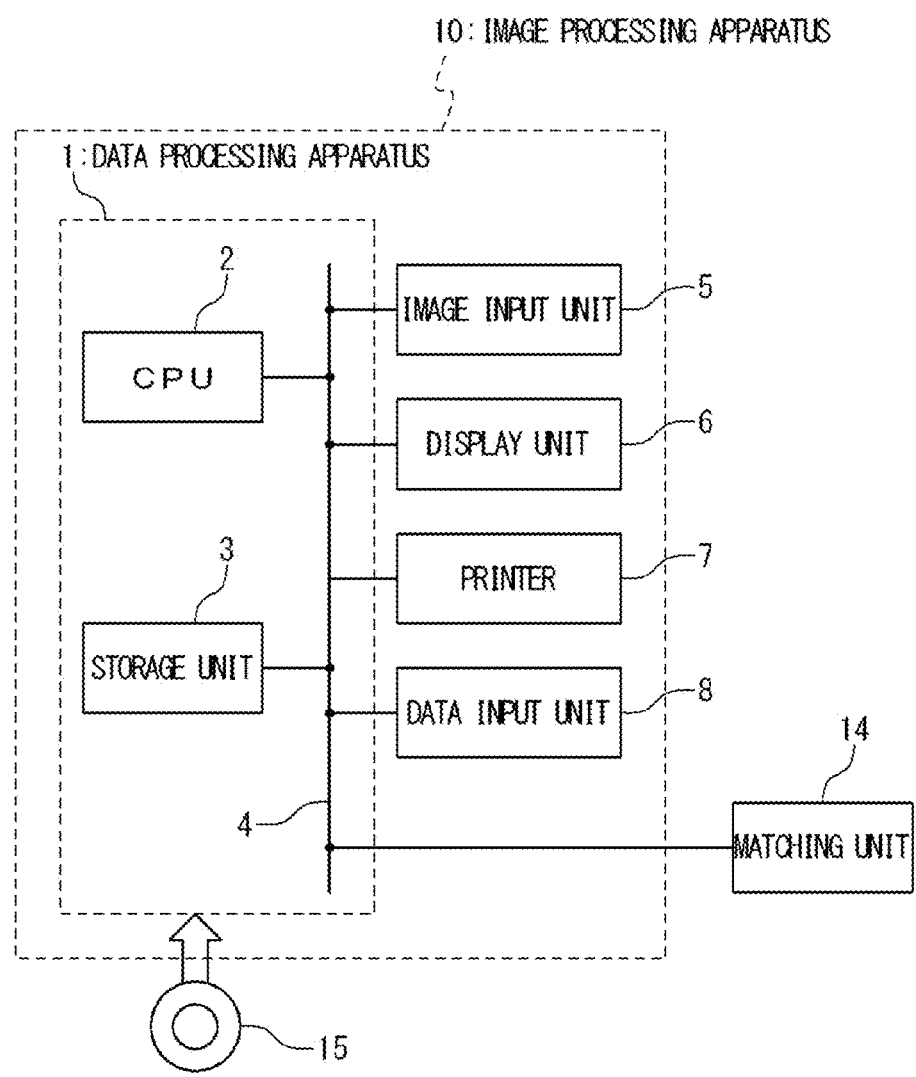
FIG. 1 shows a hardware configuration of an image processing apparatus according to a first exemplified embodiment of the present invention.

FIG. 1 shows a hardware configuration of an image processing apparatus 10 according to a first exemplified embodiment of the present invention. The image processing apparatus 10 is provided with a data processing apparatus 1 such as a personal computer, an image input unit 5 and a data input unit 8 as input units; and a display unit 6 and a printer 7 as output units. The image input unit 5 includes, for example, a fingerprint sensor, a scanner, and a recording medium reader. The data input unit 8 is, for example, a pointing device such as a mouse and tablet, and a keyboard. The data processing apparatus 1 is provided with a bus 4, a CPU (Central Processing Unit) 2 connected to the bus 4, and a storage unit 3 connected to the bus 4. The storage unit 3 is an RAM (Random Access Memory) or a magnetic disk unit. The image input unit 5, the display unit 6, printer 7, and the data input unit 8, and a matching unit 14 are connected to the bus 4 through an interface (not shown). The matching unit 14 is an external unit. The data processing apparatus 1 reads a computer program recorded in a recording medium 15, and stores it in the storage unit 3.

Figure 2:
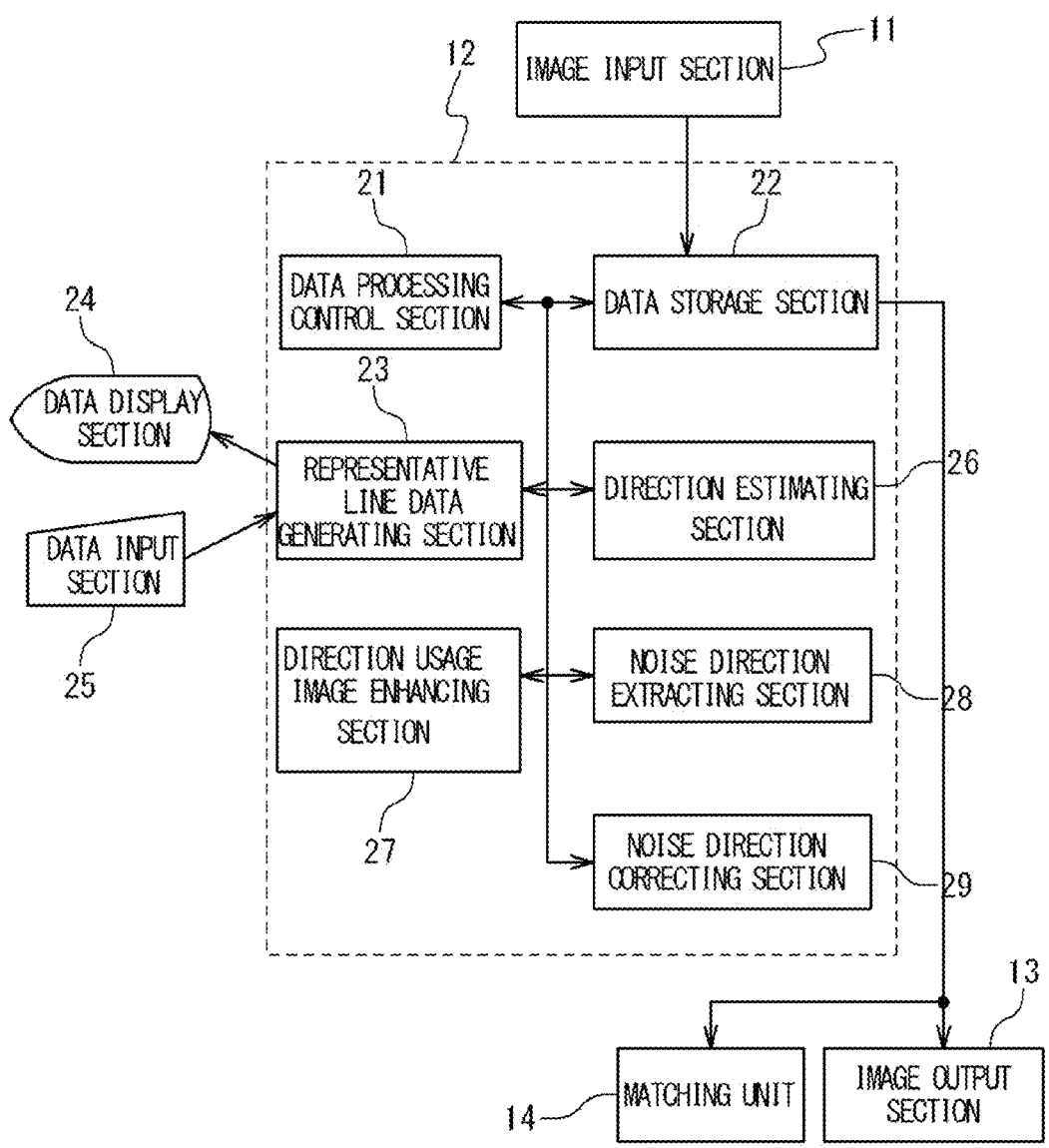
FIG. 2 is a functional block diagram of the image processing apparatus according to the first exemplified embodiment.

FIG. 2 is a functional block diagram of the image processing apparatus 10. Each of an image input section 11, an image processing section 12, an image output section 13, a data display section 24, and a data input section 25 is realized in such a manner that the CPU 2 executing a computer program to control the hardware configuration of the image processing apparatus 10. The image processing section 12 is provided with a data processing control section 21, a data storage section 22, a representative line data generating section 23, a direction estimating section 26, a direction usage image enhancing section 27, a noise direction extracting section 28, and a noise direction correcting section 29. The image input section 11 corresponds to the image input unit 5, and the image processing section 12 corresponds to the data processing apparatus 1. The data processing control section 21, the representative line data generating section 23, the direction estimating section 26, the direction usage image enhancing section 27, the noise direction extracting section 28, and the noise direction correcting section 29 correspond to the CPU 2. The data storage section 22 corresponds to the storage unit 3; the data display section 24 corresponds to the display unit 6; and the data input section 25 corresponds to the data input unit 8. The image output section 13 corresponds to the display unit 6 or the printer 7.

The data processing control section 21 controls data/message transmission and reception performed between the data storage section 22, the representative line data generating section 23, the direction estimating section 26, the direction usage image enhancing section 27, the noise direction extracting section 28, and the noise direction correcting section 29. The data storage section 22 provides a working region to the data processing control section 21, the representative line data generating section 23, the direction estimating section 26, the direction usage image enhancing section 27, the noise direction extracting section 28, and the noise direction correcting section 29, and stores data generated by them.

Figure 3:
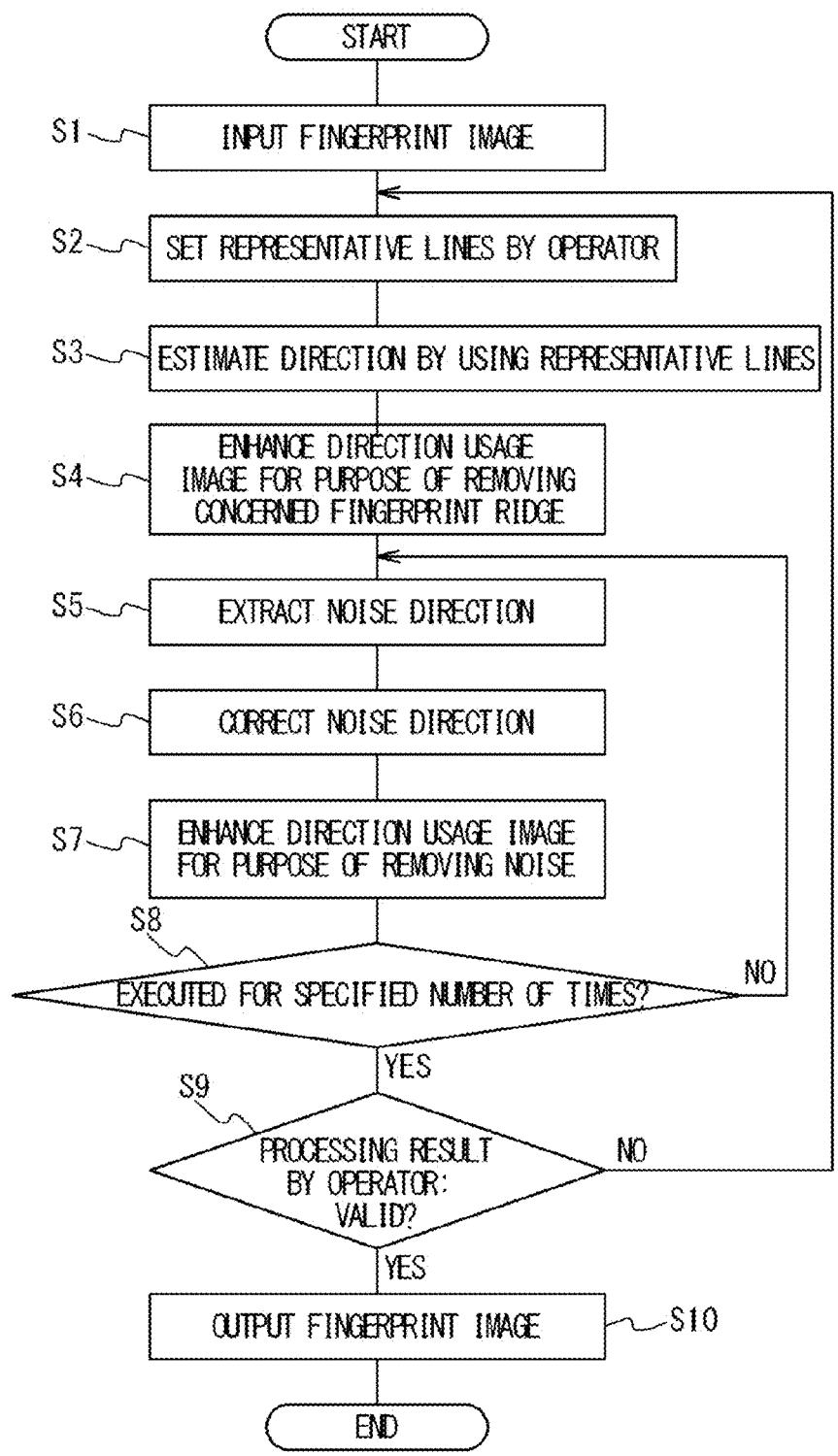
FIG. 3 is a flowchart of an image processing method according to the first exemplified embodiment.

Referring to FIG. 3, an image processing method according to the present exemplified embodiment will be described. The image processing method is provided with Steps S1 to S9.

At Step S1, the image input section 11 inputs data of a fingerprint image as a grayscale-represented image to the image processing section 12. The fingerprint image is a curved stripe pattern image, and the fingerprint image data is digital data. For example, the image input section 11 reads a fingerprint of a fingertip to generate the fingerprint image data, scans paper or the like to generate the fingerprint image data, or reads the fingerprint image data recorded in a recording medium such as a magnetic disk or an optical disk. The data storage section 22 stores the fingerprint image data.

Figure 4:
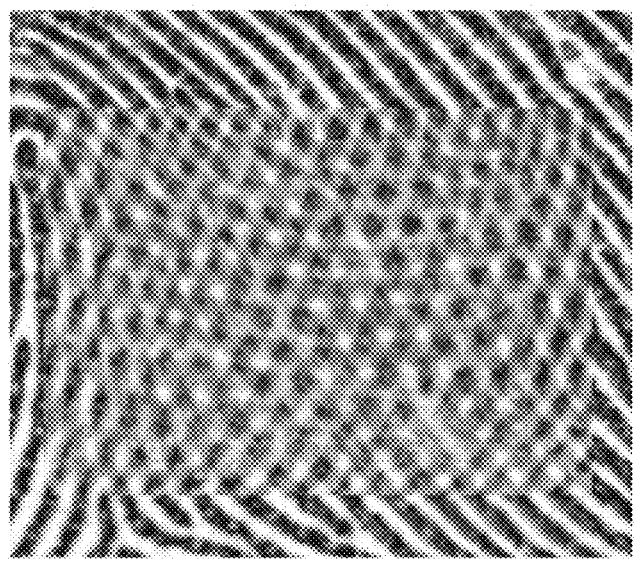
FIG. 4 shows an overlapped fingerprint image.

FIG. 4 shows an example of the fingerprint image. The fingerprint image shown in FIG. 4 is an overlapped fingerprint image in which ridges of three fingerprints overlap with one another, and includes a target fingerprint and one or more curved stripe pattern noises as the other fingerprints (hereinafter, to be referred to as noise fingerprints) that overlap with the target fingerprint. Such a fingerprint image is digitalized in the resolution of 500 dpi according to ANSI/NIST-ITL-1-2000 Data Format for the Interchange of Fingerprint, Facial, & Tattoo (SMT) Information that is standardized at the US National Institute of Standards and Technology. In addition, a document on the standardization is downloadable from the following URL (Uniform Resource Locator) on January in 2008: ftp://sequoyah.nist.gov/pub/nist_internal_reports/sp500-245-a16.pdf.

According to the above standards, each of pixels constituting the fingerprint image has any of 256-grayscale density values from 0 to 255. The luminance reference according to the above standards indicates that as the density value is increased, luminance becomes larger (lighter).

However, in the following description, a larger density value indicates a larger density (being darker). Accordingly, density values of pixels constituting a (dark) ridge portion having a large density are close to 255 that is the largest value, whereas a density value of a (light) paper material having a small density or density values of pixels constituting a (light) groove portion having a small density are close to 0 that is the smallest value. In addition, the groove is referred to a belt-like portion sandwiched between two ridges adjacent to each other.

Figure 5A:
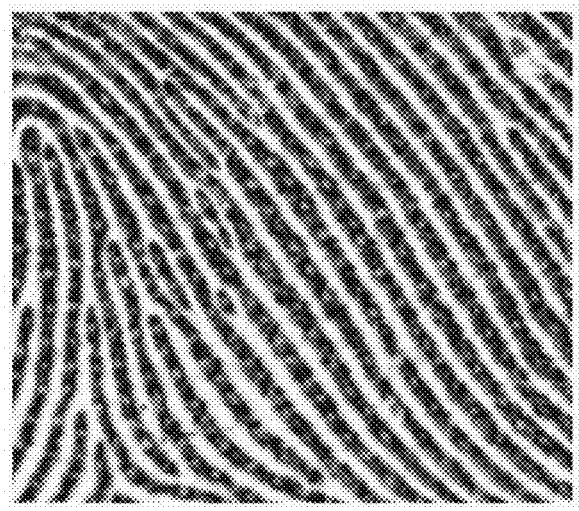
FIG. 5A shows a fingerprint image that serves as a source of the overlapped fingerprint image shown in FIG. 4.
Figure 5B:
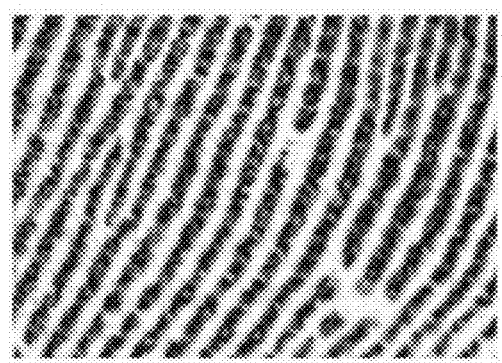
FIG. 5B shows a fingerprint image that serves as a source of the overlapped fingerprint image shown in FIG. 4.
Figure 5C:
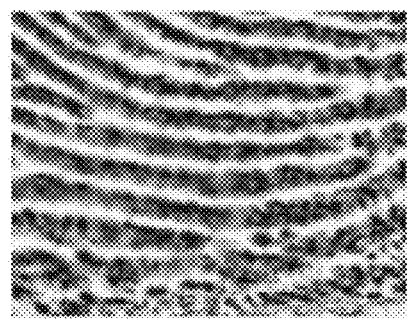
FIG. 5C shows a fingerprint image that serves as a source of the overlapped fingerprint image shown in FIG. 4.

The overlapped fingerprint image shown in FIG. 4 is a simulated latent fingerprint image that is artificially synthesized by overlapping fingerprint ridge images respectively shown in FIGS. 5A to 5C. A density value of a pixel in the overlapped fingerprint image shown in FIG. 4 is an average density value of pixels of the fingerprint ridge images shown in FIG. 5A to 5C, which correspond to the pixel in position. In the following description, the fingerprints shown in FIGS. 5A, 5B, and 5C may be respectively referred to as a target fingerprint, first curved stripe pattern noise, and second curved stripe patter noise.

In the following, a case where the image processing method is applied to the fingerprint image shown in FIG. 4 will be described.

Figure 6:
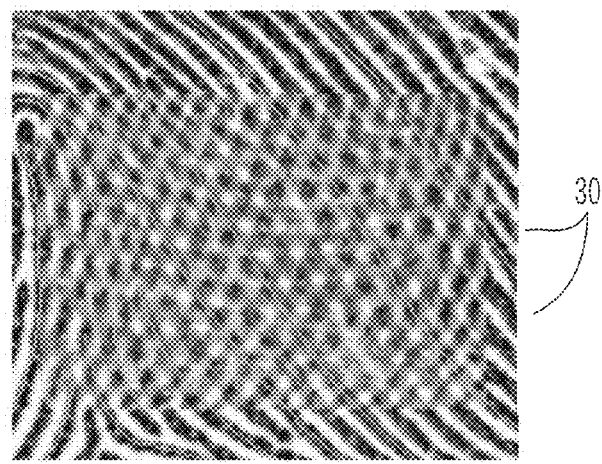
FIG. 6 shows representative lines that are set for target fingerprint ridges included in the overlapped fingerprint image shown in FIG. 4.

Subsequently, at Step S2, the representative line data generating section 23 controls the data display section 24 to display the fingerprint image shown in FIG. 4 on the basis of the fingerprint image data stored in the data storage section 22. An operator looks at the displayed fingerprint image to input representative lines 30 that represent a flow of ridges of the target fingerprint as shown in FIG. 6. The operator operates the data input section 25 to draw the representative lines 30.

The representative lines 30 are ones representing a rough flow of the ridges of the target fingerprint, and are not required to accurately trace the ridges. A plurality of points specified by the operator operating the data input section 25 are connects with a straight line to draw each of the representative lines 30. However, it is desirable to draw each of the representative lines 30 by a curve approximation such as a spline approximation based on the plurality of points. By drawing the representative lines 30 by the curve approximation, accuracy of a direction estimation to be described later is improved. In FIG. 6, the number of representative lines is nine. However, the number of representative lines is not limited to nine.

The representative line data generating section 23 generates representative line data indicating the representative lines 30 on the basis of the input operation as the operation of the data input section 25 by the operator.

Next, at Step S3, the direction estimating section 26 estimates a direction distribution of the target fingerprint ridges. The direction estimating section 26 calculates directions of the target fingerprint ridges at positions of respective pixels in the overlapped fingerprint image of FIG. 4 on the basis of the representative line data, and generates ridge pattern direction distribution data indicating the direction distribution of the target fingerprint ridges on the basis of the result of the calculation. The data storage section 22 stores the ridge pattern direction distribution data.

Figure 7:
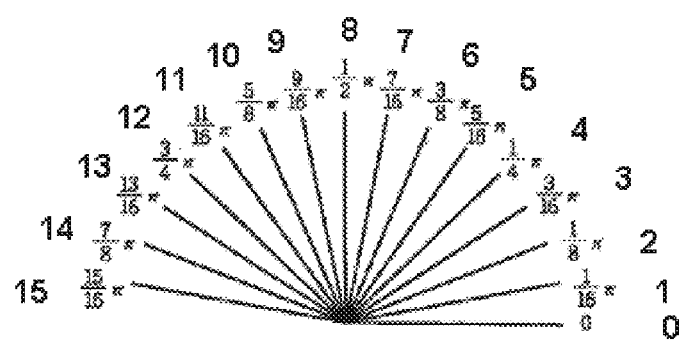
FIG. 7 shows an example of encoding of directions.

Here, a direction will be described. A direction is mathematically defined as a slope having an orientation. A flow of a fingerprint ridge has a slope but does not have an orientation, and therefore according to the mathematical definition, the representation "a direction of curved stripe pattern noise" is not appropriate. However, there are many examples of representing a slope of a fingerprint ridge as a ridge direction or simply a direction, and therefore the term "direction" is used here. Regarding encoding of a direction, there are many examples of performing encoding in eight directions at intervals of $\pi/8$ radians or performing encoding in sixteen directions at intervals of $\pi/16$ radians. In a case of performing encoding in the sixteen directions, a longer processing time is required, but accuracy is improved, rather than in case of performing encoding in the eight directions. Here, as shown in FIG. 7, the case of performing encoding in sixteen directions denoted by 0 to 15 will be described.

Also, a direction may be defined for each of the pixels, or for each block including 4×4 pixels or 8×8 pixels. As a block size is decreased, a longer processing time is required, but accuracy is improved. Here, the case of defining a direction for each of the pixels will be described. However, at the time of showing the direction distribution, sampling is performed every eight pixels in both of horizontal and vertical directions to make it readily visible.

The method disclosed in JP H07-121723 can be used to estimate the direction distribution of the target fingerprint ridges. Regarding a pixel on each of the representative lines 30, a direction of a tangent of the representative line 30 at a position of the pixel is estimated as a direction of a target fingerprint ridge at the position. Regarding a pixel not on any of the representative lines 30, a radial search from the pixel toward eight directions is made, and a direction of a first detected pixel, which has already been estimated, is used for the estimation. The number of pixels which are first detected and in which directions have already estimated is any of one to eight.

Figure 8A:
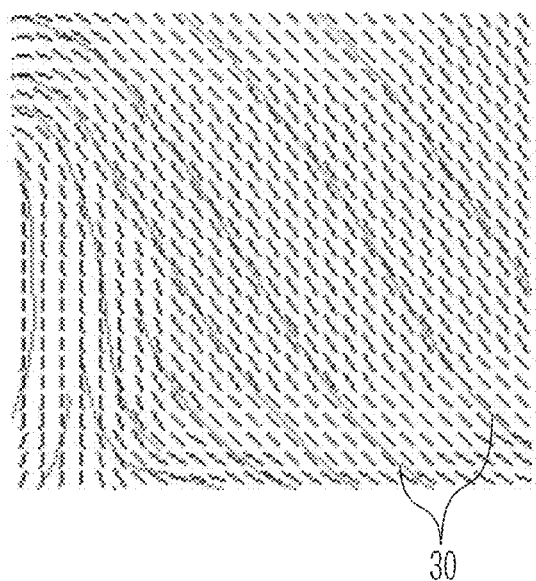
FIG. 8A shows an estimation result of a direction distribution of the target fingerprint ridges, which is represented by use of line segments, so as to overlap on the representative lines.
Figure 8B:
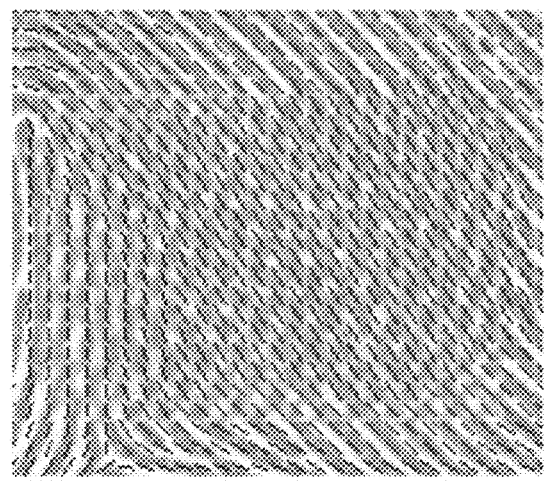
FIG. 8B shows the estimation result of the direction distribution of the target fingerprint ridges so as to overlap the estimation result on the image shown in FIG. 4.

FIG. 8A shows an estimation result of the direction distribution of the target fingerprint ridges with overlapping the estimation result on the representative lines 30. FIG. 8B shows the estimation result of the direction distribution of the target fingerprint ridges with overlapping the estimation result on the fingerprint image (FIG. 4) as the input image. In FIGS. 8A and 8B, directions are respectively represented as line segments. From FIGS. 8A and 8B, it turns out that the direction distribution of the target fingerprint ridges is accurately estimated.

Subsequently, at Step S4, in order to remove a component of the target fingerprint ridges from the overlapped fingerprint image shown in FIG. 4, the direction usage image enhancing section 27 performs an image enhancing process of enhancing density on the overlapped fingerprint image in FIG. 4, and thereby generates image processed data. In the image enhancing process, the direction usage image enhancing section 27 determines a reference region as a local region including each of the pixels of the overlapped fingerprint image shown in FIG. 4 on the basis of the ridge pattern direction distribution data. The ridge pattern direction distribution data relates a position of each of the pixels of the overlapped fingerprint image shown in FIG. 4 and a direction of a target fingerprint ridge at the position to each other. The direction usage image enhancing section 27 determines a reference region for each of the pixels of the overlapped fingerprint image in FIG. 4 on the basis of a direction of a target fingerprint ridge at a position of the pixel. The reference region is determined so as to be a belt-like region along a curved line (ridge or groove) included in the target fingerprint ridge. The direction usage image enhancing section 27 calculates a density value of the pixel after the image enhancing process on the basis of a density histogram of the reference region. The image enhancing process is based on, for example, one of the Adaptive Histogram Equalization method and the Adaptive Contract Stretch method.

Through the image enhancing process at Step S4, the target fingerprint ridges are appropriately removed, and at the same time, the first curved pattern noise and the second curved pattern noise are enhanced. The reason for this will be described below.

Referring to FIG. 4, when examining a density change along each of the ridges of the target fingerprint in an overlapped fingerprint region where the three fingerprints overlap with one another, the density of a portion where the ridge overlaps with the curved stripe pattern noises is larger than that of a portion where the ridge does not overlap with any curved stripe pattern noise. By enhancing the density change along each of the ridges of the target fingerprint, the portion of the ridge of the target fingerprint, where the ridge overlaps with the curved stripe pattern noises, is enhanced.

Referring to FIG. 4, when examining a density change along each of the grooves of the target fingerprint in the overlapped fingerprint region, a density of a portion where the groove overlaps with the curved stripe pattern noises is larger than that of a portion where the groove does not overlap with any curved stripe pattern noise is large. By enhancing the density change along each of the grooves of the target fingerprint, the portion of the groove of the target fingerprint, where the groove overlaps with the curved stripe pattern noises, is enhanced.

Accordingly, by the image enhancing process using the reference region that is determined so as to be along a curved line of each of the target fingerprint ridges, the target fingerprint ridges disappear and the curved stripe pattern noises are enhanced.

The reference region is determined, for example, in the following manner. The direction usage image enhancing section 27 extracts a pixel group (24 pixels in total) that includes, from each of the pixels in the overlapped fingerprint image shown in FIG. 4, twelve pixels toward a first side along a direction of a target fingerprint ridge at a position of the pixel, and twelve pixels toward a second side opposite to the first side. The reference region is configured to have the pixel group.

The reason of selecting the number of pixels (in this case, 24 in total) will be described. Even if the input image like the overlapped fingerprint image shown in FIG. 4 has a region where a dynamic range of a fingerprint ridge is narrow, the input image is converted through the image enhancing process to an image that has a uniform change in shade in the entire region. In such an image enhancing process, it is important to set a size of the reference region. In case of enhancing a fingerprint ridge, the size of a corresponding reference region is preferably a smallest size that contains a modification in shade of the ridge. An average ridge interval of a fingerprint is approximately 10 pixels (actual distance is 0.5 millimeters), and therefore it is appropriate to set, as the reference region, 24 pixels that is a length more than twice the average ridge interval.

Also, a width of the reference region at Step S4 is preferably a width for one pixel. If the width is larger, both of a ridge and a groove of the target fingerprint are included in the reference region, and therefore it is difficult to appropriately remove each of the target fingerprint ridges. However, even if the width of the reference region is larger than a width for two pixels, the effect of the present invention can be accomplished.

Figure 9:
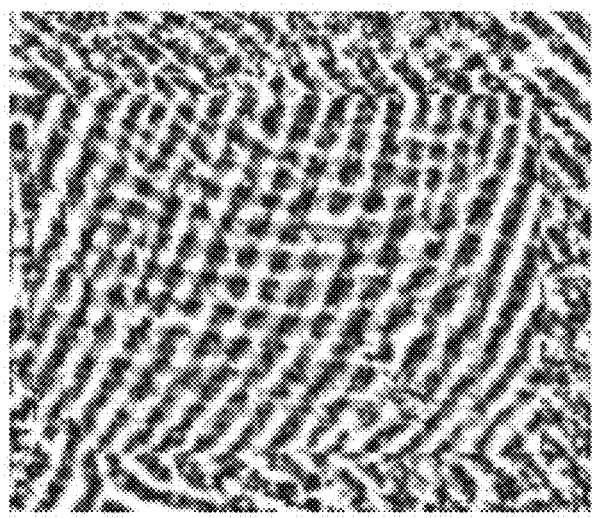
FIG. 9 shows an image resulting from performing an image enhancing process on the image shown in FIG. 4 in order to remove the target fingerprint ridges.

FIG. 9 shows an image resulting from performing the image enhancing process at Step S4 in order to remove the target fingerprint ridges. Comparing FIG. 9 and FIG. 4 with each other, it could be understood that, through the image enhancing process, the ridges of the target fingerprint almost disappear and ridges of the curved stripe pattern noises are enhanced.

Subsequently, at Step S5, the noise direction extracting section 28 extracts a direction distribution of an image enhancing processed image shown in FIG. 9. The image enhancing processed image includes the curved stripe pattern noises as a first pattern. The noise direction extracting section 28 calculates a direction of a ridge at a position of each of pixels of the image enhancing processed image, and generates first direction distribution data indicating a direction distribution of ridges (a direction distribution of the first pattern) on the basis of a result of the calculation. The data storage section 22 stores the first direction distribution data. The first direction distribution data relates a position of each of the pixels of the image enhancing processed image shown in FIG. 9 and a direction of a ridge of curved stripe pattern noise at the position (a direction of the first pattern) to each other. The noise direction extracting section 28 uses, for example, a method, described in JP S52-97298, of extracting the direction distribution of the ridges from the image enhancing processed image.

Figure 10:
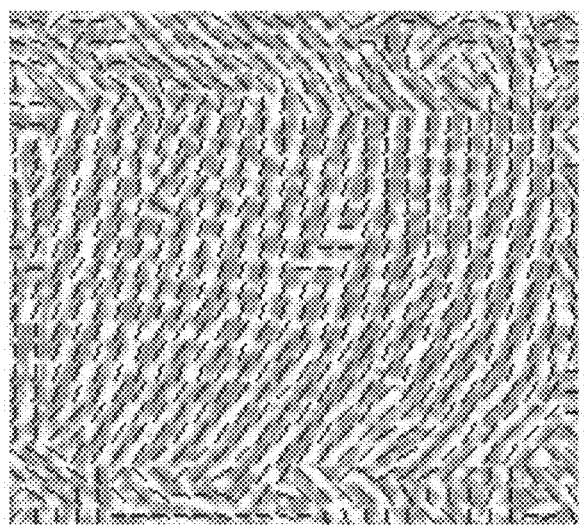
FIG. 10 shows a direction distribution extracted from the image shown in FIG. 9 with overlapping the direction distribution on the image shown in FIG. 9.

FIG. 10 shows the direction distribution extracted from the image enhancing processed image shown in FIG. 9 with overlapping the direction distribution on the image enhancing processed image shown in FIG. 9. From FIG. 10, it could be understood that the direction distribution of the curved stripe pattern noises included in the image enhancing processed image is accurately extracted.

Next, at Step S6, the noise direction correcting section 29 corrects the first direction distribution data on the basis of the ridge pattern direction distribution data to generate corrected first direction distribution data. The data storage section 22 stores the corrected first direction distribution data.

It should be noted that the ridge pattern direction distribution data relates a position in the image shown in FIG. 4 and a ridge direction as a direction of a target fingerprint ridge at the position to each other. The first direction distribution data relates a first position in the image shown in FIG. 9 and a first direction as a direction of curved stripe pattern noise (first pattern) at the first position to each other. The position in the image shown in FIG. 4 and the first position correspond to each other. If a difference between the ridge direction and the first direction falls within a predetermined range, the noise direction correcting section 29 replaces the first direction by an orthogonal direction orthogonal to the ridge direction to generate the corrected first direction distribution data.

In the present exemplified embodiment, this threshold value is set to, for example, n/16 radians (11.25 degrees). That is, if the directional difference is equal to or less than n/16, the direction of the curved stripe pattern noise is replaced by the direction orthogonal to the target fingerprint ridge direction. For example, if a direction of curved stripe pattern noise at some pixel is a direction code 7 (7π/16 radians) and a direction of a target fingerprint ridge in a pixel corresponding to a position of the pixel is a direction code 6 (3π/8 radians), the directional difference is π/16 radians, which is equal to or less than the threshold value of π/16 radians, and therefore the direction of the curved stripe patter noise is replaced from the directional code 7 to a directional code 14 (7π/8 radians).

The meaning of this correction will be described here. The fact that if the first direction distribution data on the curved stripe pattern noises is used to perform direction usage image enhancement on the image shown in FIG. 4, the influence of the curved stripe pattern noises can be removed to enhance the target fingerprint ridges at the same time is as disclosed in JP 2009-223562A. However, if a direction of curved stripe pattern noise, which is automatically extracted at Step S5, is close to a direction of a target fingerprint ridge, the component of the target fingerprint ridges is removed from the image shown in FIG. 4 by the direction usage image enhancement. For this reason, if a direction of curved stripe pattern noise, which is automatically extracted at Step S5, is close to a direction of a target fingerprint ridge, a risk that the component of the target fingerprint ridges is removed is reduced by replacing the automatically extracted direction of the curved stripe pattern noise by a direction orthogonal to the direction of the target fingerprint ridge.

Subsequently, at Step S7, in order to remove the component of the curved stripe pattern noises from the image shown in FIG. 4, the direction usage image enhancing section 27 executes the image enhancing process that enhances density, by using directionality of the curved stripe pattern noises to generate image processed data. The direction usage image enhancing section 27 executes the image enhancing process on the data of the input image shown in FIG. 4 by using the corrected first direction distribution data obtained at Step S6 to generate the image processed data. It should be noted that the input image shown in FIG. 4 includes the component of the target fingerprint ridges.

The processing content at Step S7 is the same as that of previously described Step S4 although data to be used is different. The ridge pattern direction distribution data relates a grayscale image position as a position of a grayscale image pixel in the grayscale image shown in FIG. 4 and a target fingerprint ridge pattern direction as a direction of a target fingerprint ridge pattern at the grayscale image position to each other. In the image enhancing process at Step S4, the direction usage image enhancing section 27 determines a first reference region as a local region including the grayscale image pixels on the basis of the target fingerprint ridge direction, and calculates a density value in the grayscale image pixel after the image enhancing process on the basis of a first density histogram of the first reference region. The corrected first direction distribution data relates a ridge direction usage image enhancing processed image position as a position of a ridge direction usage image enhancing processed image pixel of the ridge direction usage image enhancing processed image shown in FIG. 9 and a first pattern direction as a direction of curved stripe pattern noise (first pattern) at the ridge direction usage image enhancing processed image position to each other. It should be noted that the ridge direction usage image enhancing processed image position and the grayscale image position correspond to each other. In the image enhancing process at Step S7, the direction usage image enhancing section 27 determines a second reference region as a local region including the grayscale image pixel on the basis of the first pattern direction, and on the basis of a second histogram of the second reference region, calculates a density value in the grayscale image pixel after the image enhancing process Through the execution of the image enhancing process at Step S7, at least one type of curved stripe pattern noise is appropriately removed, and at the same time, the target fingerprint ridges are enhanced. The reason for this is disclosed in JP 2009-223562A.

Figure 11:
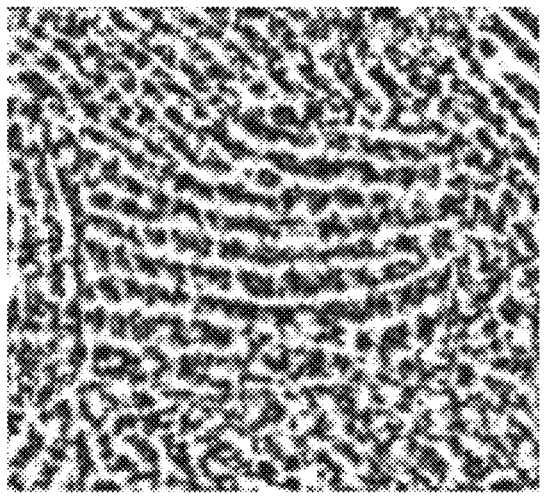
FIG. 11 shows an image resulting from performing the image enhancing process on the image shown in FIG. 9 in order to remove curved stripe pattern noise.

FIG. 11 shows an image resulting from performing the image enhancing process at Step S7 in order to remove curved stripe pattern noise. Comparing FIGS. 11 and 9 with each other, by the image enhancing process, it could be understood that a component of the first curved stripe pattern noise rising upwardly in a right direction almost disappears, and ridges of the second curved stripe pattern noise that are nearly horizontal and the target fingerprint ridges are enhanced.

Next, at Step S8, it is determined whether or not the image enhancing process for the purpose of the noise removal (steps at Steps S5 to S7) has been performed a predetermined number of times. If not performed, the control flow returns to Step S5 to start a removing process of other curved stripe pattern noise. In the present exemplified embodiment, the predetermined number of times is set to two. Through performing the process twice, the fingerprints other than the target fingerprint are removed from the overlapped fingerprints in which the three fingerprints overlap with one another, and thereby the target fingerprint is enhanced.

The predetermined number of times may be set to three or more. However, an effect of setting the predetermined number of times to three or more is small. The reasons for this is in that the overlapped fingerprints in which four or more fingerprints overlap with one another are unusual, and in the overlapped fingerprints in which four or more fingerprints overlap with one another, it is difficult to remove the curved stripe pattern noise having directions close to directions of ridges of a target fingerprint.

In the following, the second noise removal (the second cycle of Steps S5 to S7) will be described.

At Step S5, the noise direction extracting section 28 extracts a direction distribution in a second pattern included in an image from the image shown in FIG. 11, and generates second direction distribution data indicating the direction distribution. It should be noted that the image shown in FIG. 11 includes the curved stripe pattern noise as the second pattern.

Figure 12:
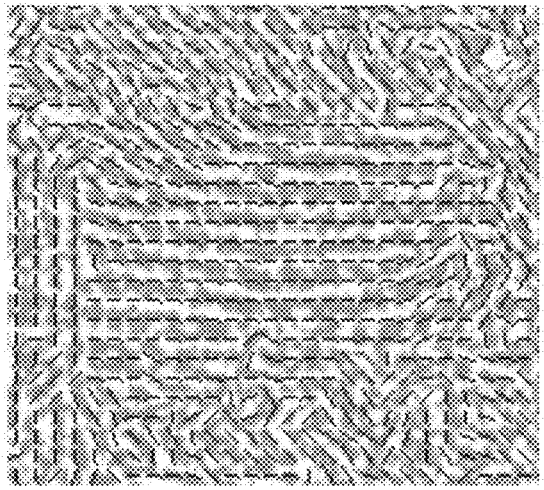
FIG. 12 shows a direction distribution extracted from the image shown in FIG. 11 with overlapping the direction distribution on the image shown in FIG. 11.

FIG. 12 shows the direction distribution extracted from the image shown in FIG. 11 with overlapping the direction distribution on the image shown in FIG. 11. From FIG. 12, it could be understood that the direction distribution of the second curved stripe pattern noise is accurately extracted.

Next, at Step S6, the noise direction correcting section 29 corrects the second direction distribution data on the basis of the ridge pattern direction distribution data to generate corrected second direction distribution data. The second processing of Step S6 is the same as the first processing of Step S6.

Subsequently, at Step S7, in order to remove a component of the second curved stripe pattern noise from the image shown in FIG. 11, the direction usage image enhancing section 27 performs the image enhancing process that enhances density by using directionality of the second curved stripe pattern noise, and thereby generates image processed data. The direction usage image enhancing section 27 uses the corrected second direction distribution data obtained in the second processing of Step S6 to perform the image enhancing process on data of the image shown in FIG. 11, and thereby generates the image processed data. The second processing of Step S7 is the same as the previously described first processing of Step S7.

Figure 13:
FIG. 13 shows an image resulting from performing the image enhancing process on the image shown in FIG. 11 in order to remove curved stripe pattern noise.

FIG. 13 shows an image resulting from performing the image enhancing process at Step S7 in order to remove the second curved stripe pattern noise. Comparing FIGS. 13 and 11 with each other, it could be understood that the component of the second curved stripe pattern noise nearly in horizontal almost appears in FIG. 13 by the image enhancing process, and at the same time the target fingerprint ridges are enhanced.

The final processed image shown in FIG. 13 is close to the image shown in FIG. 5A, and therefore it can be said that noise processing performance of the image processing method according to the present exemplified embodiment is high. In a conventional technique that uses a frequency analysis to provide ridge enhancement so as to achieve an average period, the ridge enhancement is not well provided in a region where a ridge interval drastically changes, so that narrow ridges disappear. However, according to the present exemplified embodiment, narrow ridges are prevented from disappearing.

Next, at Step S8, it is determined whether or not the image enhancing process for the purpose of noise removal (processing at Steps S5 to S7) has been performed the predetermined number of times. If performed, the control flow proceeds to Step S9.

Next, at Step S9, the representative line data generating section 23 controls the data display section 24 to display the finally processed image shown in FIG. 13 and the estimation results of the direction distribution of the target fingerprint ridges shown in FIGS. 8A and 8B, and prompts the operator to determine whether or not the image processing is adequate. If it is determined that the image processing is not adequate, the control flow returns to Step S2 in order to add or correct a representative line 30. Steps S2 to S8 are repeated until the operator determines that the image processing is adequate. If the operator determines that the image processing is adequate, the control flow proceeds to Step S10.

At Step S10, the data processing control section 21 outputs data of the final processed image to the image output section 13, the matching unit 14, or a feature extracting unit (not shown). The image output section 13 displays or prints the final processed image shown in FIG. 13 on the basis of the final processed image data. The matching unit 14 uses the final processed image data for fingerprint matching. A feature extracting unit extracts a feature amount from the final processed image on the basis of the final processed image data.

According to the present exemplified embodiment, in a latent fingerprint image, one or more curved stripe pattern noises are removed, and ridges of a target fingerprint are enhanced. Accordingly, determination by a judge becomes easier. Also, a feature amount of the target fingerprint is appropriately extracted, and therefore fingerprint matching accuracy using the feature amount is improved.

In the following, a result in a case of applying the image processing method according to the present exemplified embodiment to a fingerprint image shown in FIG. 14 will be described.

Figure 14:
FIG. 14 shows an overlapped fingerprint image including character noise.

The fingerprint image shown in FIG. 14 is an overlapped fingerprint image in which ridges of two fingerprints overlap with each other, and includes a target fingerprint, one type of curved stripe pattern noise as the other fingerprint (hereinafter referred to as a noise fingerprint) that overlaps with the target fingerprint, and character noise. The character noise includes character strings "AWAL" and "ONPEN". The fingerprint image shown in FIG. 14 is digitalized in the same manner as in the fingerprint image shown in FIG. 4. In an upper portion of the fingerprint image shown in FIG. 14, the curved stripe pattern noise overlaps with the target fingerprint, and in a lower portion of the fingerprint image shown in FIG. 14, the character noise overlaps with the target fingerprint.

Figure 15:
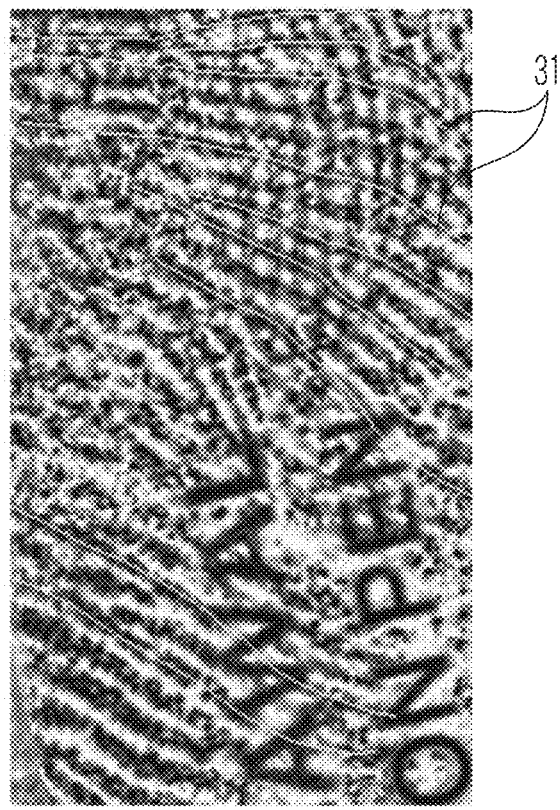
FIG. 15 shows representative lines set for target fingerprint ridges included in the overlapped fingerprint image shown in FIG. 14.
Figure 16:
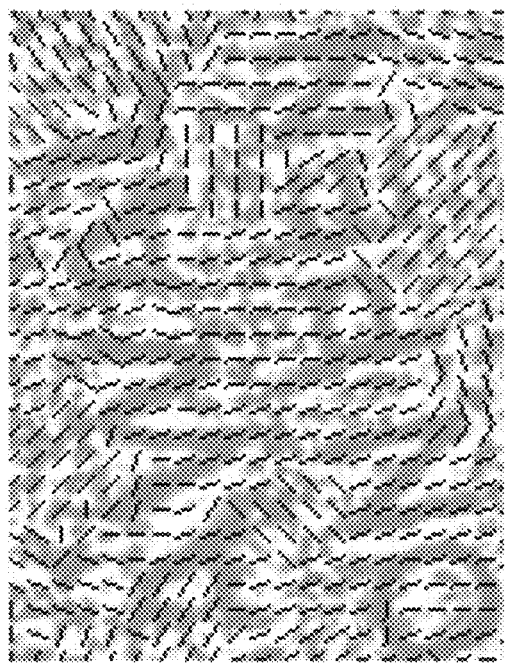
FIG. 16 shows a noise direction distribution extracted by applying the image processing method according to the first exemplified embodiment to the image shown in FIG. 14.

FIG. 15 shows eight representative lines 31 that are inputted at Step S2. The representative lines 31 represent a flow of ridges of the target fingerprint shown in FIG. 14. FIG. 16 shows a direction distribution that is extracted at Step S5. The direction distribution does not accurately represent directions of the character noise.

Figure 17:
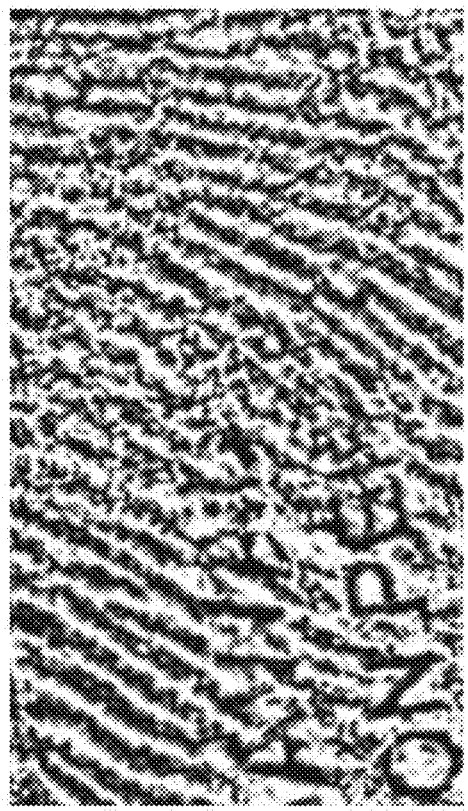
FIG. 17 shows an image resulting from applying the image processing method according to the first exemplified embodiment to the image shown in FIG. 14.

FIG. 17 shows a final processed image that is a result when the image processing method according to the present exemplified embodiment is applied to the fingerprint image shown in FIG. 14. In an upper portion of the final processed image, the curved stripe pattern noise is removed, and the ridges of the target fingerprint are enhanced. However, it could be understood that in a lower portion of the final processed image, removal of the character noise is insufficient. The reason why the removal of the character noise is insufficient is in that at Step S5, the directions of the character noise cannot be accurately extracted.

Second Exemplified Embodiment

The image processing method according to a second exemplified embodiment of the present invention will be described. The image processing method according to the second exemplified embodiment is suitable for image processing of a fingerprint image having character noise as shown in FIG. 14.

The image processing method according to the second exemplified embodiment is performed by the image processing apparatus 10, and is the same as the image processing method according to the first exemplified embodiment except for Step S5. An example of the case of applying the image processing method according to the second exemplified embodiment to the fingerprint image shown in FIG. 14 will be described.

At Step S5 according to the second exemplified embodiment, when each of pixels of the image serving as a processing target has a density value equal to or more than a predetermined threshold value (e.g., 128), the noise direction extracting section 28 detects a plurality of continuous pixel lines that include the pixel and respectively extend in a plurality of predetermined quantization directions (e.g., 16 directions), on the assumption that any pixel included in the plurality of continuous pixel lines has a density value equal to or more than the predetermined threshold value (e.g., 128). As a pattern direction at the pixel, a quantization direction of one among the plurality of continuous pixel lines which has the largest pixel number is adopted. In each of the pixels of the image serving as the processing target, if the pixel has a density value less than the predetermined threshold value (e.g., 128), the noise direction extracting section 28 determines a direction of one pixel whose direction is known, among eight pixels in the neighborhood of the pixel, as a pattern direction. If there are plural pixels of which directions are known, among the neighboring eight pixels, a pixel direction in which the continuous pixel line has the largest pixel number, among the plurality of pixel directions is adopted as a pattern direction in the pixel. As a result, direction distribution data generated at Step S5 according to the present exemplified embodiment relates a position of the pixel and the pattern direction to each other.

Figure 18:
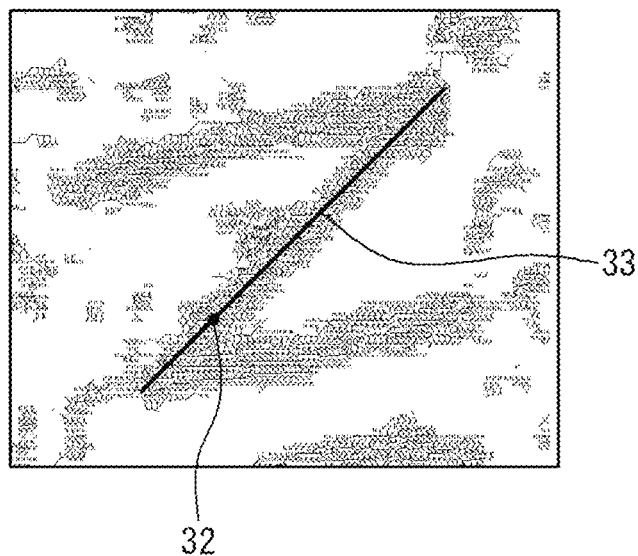
FIG. 18 is an explanatory diagram explaining noise direction extraction in an image processing method according to a second exemplified embodiment of the present invention.

Referring to FIG. 18, Step S5 according to the present exemplified embodiment will be specifically described. FIG. 18 shows a portion (around a character "N") of a binarized image obtained by binarizing the image serving as the processing target of Step S5 according to the present exemplified embodiment on the basis of the predetermined threshold value. The noise direction extracting section 28 detects a continuous pixel line 33 that includes a pixel 32 and extends in a quantization direction, on the assumption that any pixel included in the pixel line 33 has a density value equal to or more than the predetermined threshold value, and obtains the number of pixels included in the pixel line 33. The noise direction extracting section 28 repeats this process for each of the plurality of predetermined quantization directions, and as a direction in the pixel 32, adopts a quantization direction meeting the largest pixel number.

The above direction extracting method uses the fact that a character consists of strokes in which pixels respectively having large density values are linearly continuing, and this is suitable for extracting directions of character noise.

Figure 19:
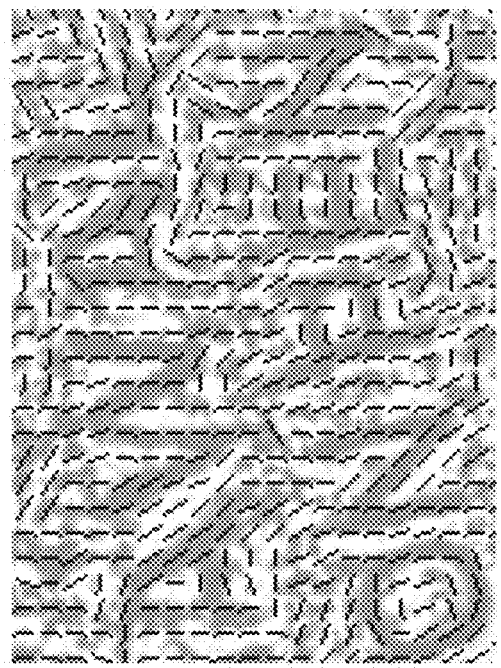
FIG. 19 shows a noise direction distribution extracted by applying the image processing method according to the second exemplified embodiment to the image shown in FIG. 14.

FIG. 19 shows an image in which a direction distribution extracted at Step S5 according to the present exemplified embodiment is overlapped on the image serving as the processing target of Step S5. Comparing FIGS. 19 and 16, it could be understood that the directions of the character noise shown in FIG. 19 are more accurately extracted.

According to the present invention, performance to remove character noise is improved, and at the same time, performance to enhance ridges of a target fingerprint is improved.

Figure 20:
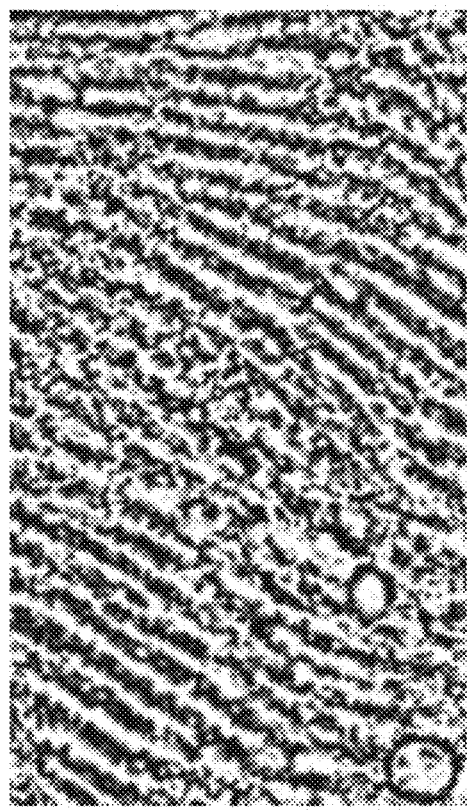
FIG. 20 shows an image resulting from applying the image processing method according to the second exemplified embodiment to the image shown in FIG. 14.

FIG. 20 shows a final processed image as a result when the image processing method according to the present exemplified embodiment is applied to the fingerprint image shown in FIG. 14. Comparing FIG. 17 showing the result when the image processing method according to the first exemplified embodiment is applied to the fingerprint image shown in FIG. 14 and FIG. 20 with each other, it could be understood that according to the present exemplified embodiment, the performance to remove character noise is improved and at the same time, the performance to enhance ridges of a target fingerprint is improved.

Third Exemplified Embodiment

Next, an image processing apparatus and image processing method according to a third exemplified embodiment of the present invention will be described. In each of the first and second exemplified embodiments, the direction distribution of the target fingerprint ridges is obtained on the basis of the operator's input operation. However, in the present exemplified embodiment, a direction distribution of target fingerprint ridges is automatically extracted.

A hardware configuration of the image processing apparatus 10 according to the present exemplified embodiment is the same as that of the image processing apparatus 10 according to the first exemplified embodiment.

Figure 21:
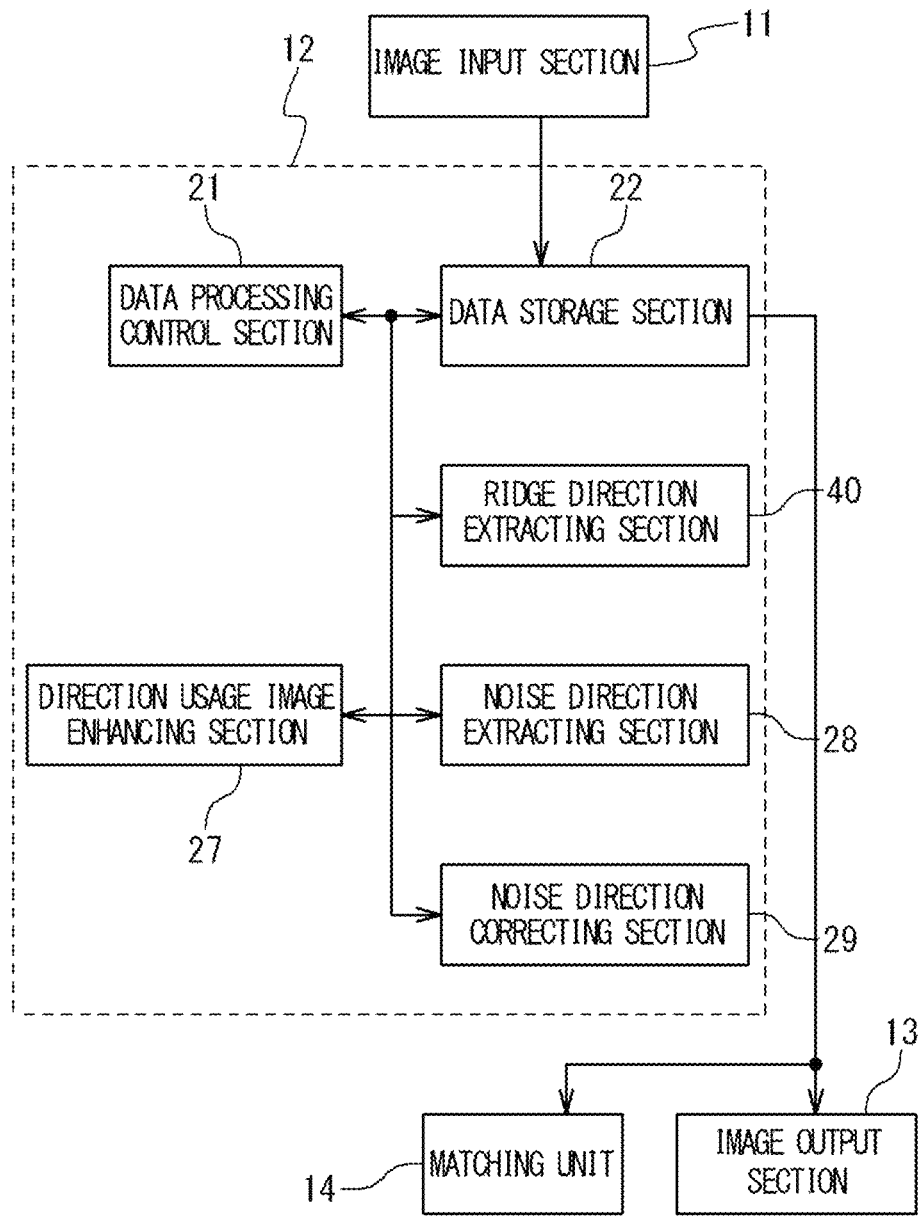
FIG. 21 is a functional block diagram of an image processing apparatus 10 according to a third exemplified embodiment.

FIG. 21 is a functional block diagram of the image processing apparatus 10 according to the present exemplified embodiment. Each of the image input section 11, the image processing section 12, and the image output section 13 is realized in such a manner that the CPU 2 executes a computer program to control hardware configuration of the image processing apparatus 10. The image processing section 12 is provided with the data processing control section 21, the data storage section 22, the ridge direction extracting section 40, the direction usage image enhancing section 27, the noise direction extracting section 28, and the noise direction correcting section 29. The image input section 11 corresponds to the image input unit 5, and the image processing section 12 corresponds to the data processing apparatus 1. The data processing control section 21, the ridge direction extracting section 40, the direction usage image enhancing section 27, the noise direction extracting section 28, and the noise direction correcting section 29 correspond to the CPU 2. The data storage section 22 corresponds to the storage unit 3. The image output section 13 corresponds to the display unit 6 or the printer 7.

The data processing control section 21 controls data/message transmission and reception performed between the data storage section 22, the ridge direction extracting section 40, the direction usage image enhancing section 27, the noise direction extracting section 28, and the noise direction correcting section 29. The data storage section 22 provides a working area for the data processing control section 21, the ridge direction extracting section 40, the direction usage image enhancing section 27, the noise direction extracting section 28, and the noise direction correcting section 29, and stores data generated by them.

Figure 22:
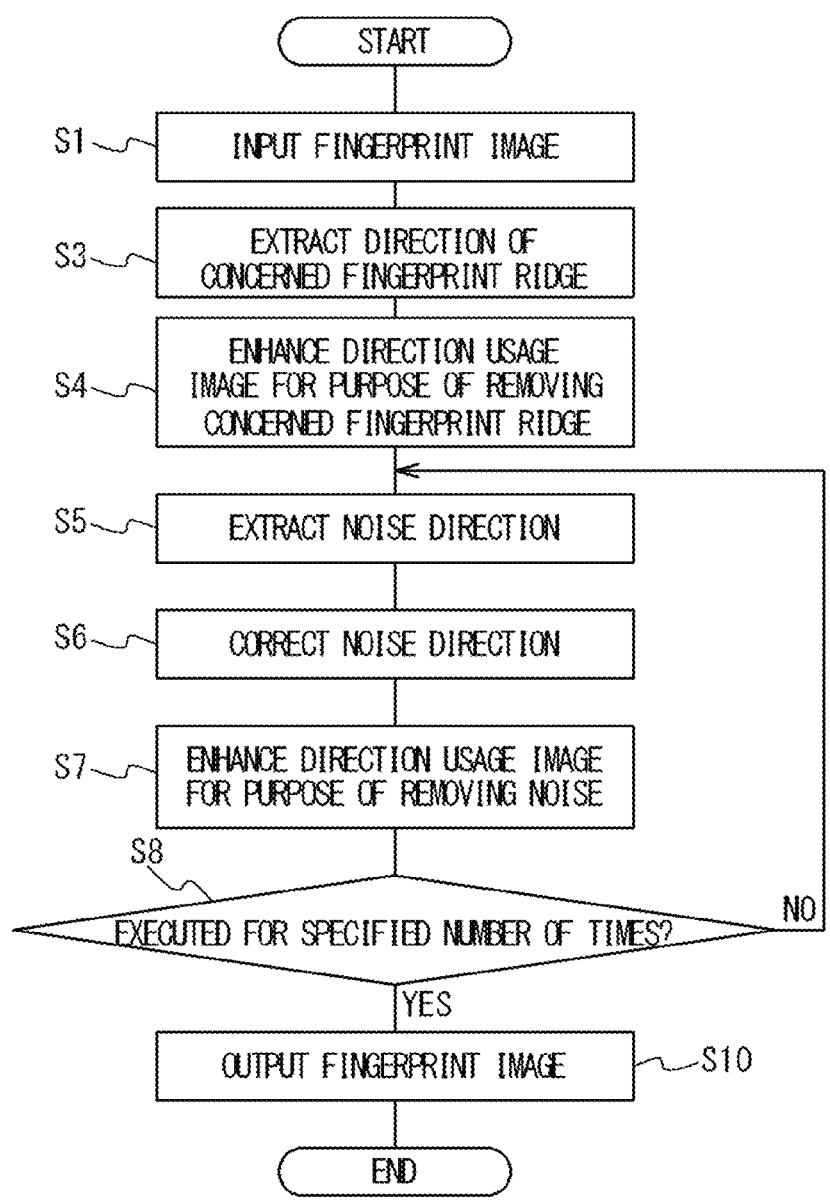
FIG. 22 is a flowchart of an image processing method according to the third exemplified embodiment.

Referring to FIG. 22, the image processing method according to the present exemplified embodiment will be described. The image processing method is provided with Step S1, Steps S3 to S8, and Step S10. Steps S2 and S9 are not used. An example that the image processing method according to the present exemplified embodiment is applied to a fingerprint image shown in FIG. 23 will be described. The fingerprint image shown in FIG. 23 includes a target fingerprint and a plurality of wrinkles 35. In each of the wrinkles 35, pixels respectively having lower density values are continuing.

Step 1 according to the present exemplified embodiment is the same as Step 1 according to the first exemplified embodiment.

Next, at Step S3, the ridge direction extracting section 40 automatically extracts a direction distribution of target fingerprint ridges. The ridge direction extracting section 40 calculates a direction of a target fingerprint ridge at a position of each of pixels in the fingerprint image shown in FIG. 23 on the basis of fingerprint image data on the fingerprint image shown in FIG. 23, and generates ridge pattern direction distribution data indicating the direction distribution of the target fingerprint ridges on the basis of a result of the calculation. The data storage section 22 stores the ridge pattern direction distribution data.

The ridge direction extracting section 40 may use the method disclosed in JP S52-97298A to extract the direction distribution of the target fingerprint ridges. However, preferably, it uses a method disclosed in JP H09-167230A to extract the direction distribution of the target fingerprint ridges. In the method disclosed in JP H09-167230A, an image serving as a target is divided into a plurality of small regions. The two-dimensional Fourier transformation is performed for each of the small regions. A direction in each of the small regions is determined on the basis of a result of the two-dimensional Fourier transformation. By using the method disclosed in JP H09-167230A, performance to extract a direction distribution of target fingerprint ridges when stripe pattern noise like the wrinkles 35 is present is improved.

Figure 23:
FIG. 23 shows a fingerprint image including wrinkles.
Figure 24:
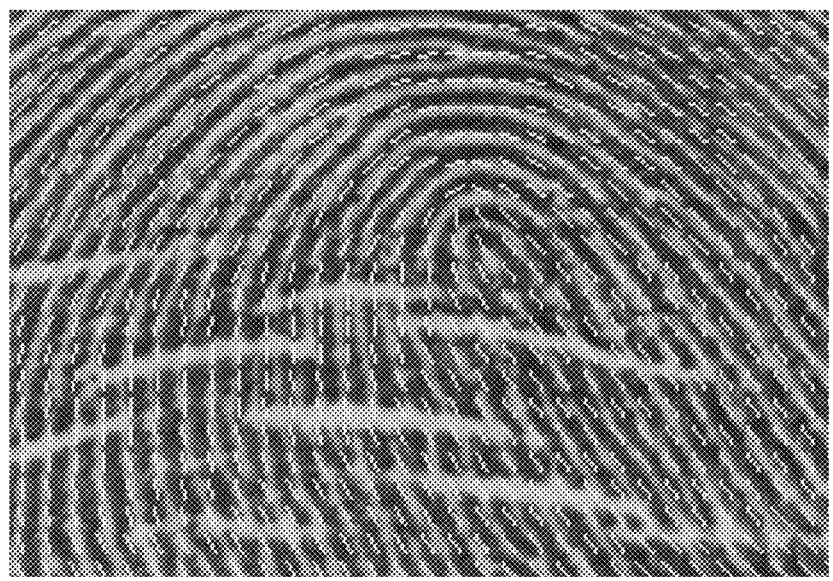
FIG. 24 shows a direction distribution of target fingerprint ridges included in the fingerprint image shown in FIG. 23, which is extracted by the image processing method according to the third exemplified embodiment, so as to overlap on the image shown in FIG. 23.

FIG. 24 shows a result obtained by the ridge direction extracting section 40 that extracts the direction distribution of the target fingerprint ridges from the fingerprint image shown in FIG. 23 so as to overlap on the fingerprint image (FIG. 23) as an input image. FIG. 24 shows the result when the ridge direction extracting section 40 uses the method disclosed in JP H09-167230A to extract the direction distribution of the target fingerprint ridges. Comparing FIGS. 23 and 24 with each other, it could be understood that the direction distribution of the target fingerprint ridges is accurately extracted.

Step S4 according to the present exemplified embodiment is the same as Step S4 according to the first exemplified embodiment. At Step S4, in order to remove the component of the target fingerprint ridges from the fingerprint image shown in FIG. 23, the direction usage image enhancing section 27 performs the image enhancing process that enhances density, on the fingerprint image shown in FIG. 23.

Next, at Step S5, the noise direction extracting section 28 extracts a direction distribution of an image enhancing processed image obtained as a result of the image enhancing process at Step S4. In each of pixels of the image enhancing processed image, if the pixel has a density value equal to or more than a predetermined threshold value (e.g., 128), the noise direction extracting section 28 detects a plurality of continuous pixel lines that include the pixels and respectively extend in a plurality of predetermined quantization directions (e.g., 16 directions), on the assumption that any pixel included in the plurality of continuous pixel lines has a density value equal to or more than the predetermined threshold value. If the pixel has a density value less than the predetermined threshold value, the noise direction extracting section 28 detects a plurality of continuous pixel lines that include the pixel and respectively extend in the plurality of predetermined quantization directions, on the assumption that any pixel included in the plurality of continuous pixel lines has a density value less than the predetermined threshold value. As a pattern direction at the pixel, the noise direction extracting section 28 adopts a quantization direction in which one continuous pixel line having the largest pixel number among the plurality of detected continuous pixel lines extends. As a result, direction distribution data generated at Step S5 according to the present exemplified embodiment relates a position of the pixel and the pattern direction to each other.

According to Step S5 according to the present exemplified embodiment, directions of noise including directions of the wrinkles 35 in which pixels respectively having lower density values are continuing are extracted.

Subsequently, the control flow proceeds to Step S6. Steps S6 to S8 according to the present exemplified embodiment are the same as Steps S6 to S8 according to the first exemplified embodiment. However, at Step S8, if the image enhancing process for the purpose of noise removal (processing steps at Steps S5 to S7) has been performed a predetermined number of times, the control flow proceeds to Step S10.

Step S10 according to the present exemplified embodiment is the same as Step S10 according to the first exemplified embodiment.

Figure 25:
FIG. 25 is an image resulting from applying the image processing method according to the third exemplified embodiment to the image shown in FIG. 23.

FIG. 25 shows a final processed image as a result when the image processing method according to the present exemplified embodiment is applied to the fingerprint image shown in FIG. 23. Looking at FIG. 25, it could be understood that even in a region of the wrinkles 35, shade is accurately enhanced, and continuity of the target fingerprint ridges is clarified.

Figure 26:
FIG. 26 is an image resulting from applying a conventional image processing method to the image shown in FIG. 23.

FIG. 26 shows a result when the conventional image processing method is used to enhance the ridges of the fingerprint image shown in FIG. 23. In the conventional image processing method, the fingerprint image shown in FIG. 23 is divided into a plurality of small regions, and periodicity of the small regions (ridge direction and ridge interval) is used to enhance the ridges. As shown in FIG. 26, in the conventional image processing method, ridges each having a minute density difference included in the original image (FIG. 23) cannot be enhanced in some cases.

On the other hand, according to the image processing method according to the present exemplified embodiment, independently of the periodicity of the small regions, the ridges each having a minute density difference included in the original image (FIG. 23) can be enhanced.

Modification of Third Exemplified Embodiment

A modification of the third exemplified embodiment will be described. If Step S5 in the above-described third exemplified embodiment is changed as follows, Step S6 can be omitted.

At Step S5 according to the modification of the third exemplified embodiment, the noise direction extracting section 28 extracts a direction distribution of the image enhancing processed image obtained as a result of the image enhancing process at Step S4, on the basis of the direction distribution of the target fingerprint ridges. In each of pixels of the image enhancing processed image, the noise direction extracting section 28 determines a plurality of second quantization directions obtained by removing a direction close to a direction of a target fingerprint ridge corresponding to a position of the pixel from a plurality of predetermined first quantization directions (e.g., 16 directions). If the pixel has a density value equal to or more than a predetermined threshold value (e.g., 128), the noise direction extracting section 28 detects a plurality of continuous pixel lines that include the pixel and respectively extend in the plurality of second quantization direction, on the assumption that any pixel included in the plurality of continuous pixel lines has a density value equal to or more than the predetermined threshold value. If the pixel has a density value less than the predetermined threshold value, the noise direction extracting section 28 detects a plurality of continuous pixel lines that include the pixel and respectively extend in the plurality of second quantization directions, on the assumption that any pixel included in the plurality of continuous pixel lines has a density value less than the threshold value. It should be noted that the direction close to the direction of the target fingerprint ridge is, for example, a direction that has a difference equal to or less than a predetermined threshold value from the direction of the target fingerprint ridge. The noise direction extracting section 28 adopts a quantization direction in which a continuous pixel line having the largest pixel number among the plurality of detected continuous pixel lines extends, as a pattern direction at the pixel. As a result, the direction distribution data generated at Step S5 according to the present modification relates the position of the pixel and the pattern direction to each other. The direction distribution data generated at Step S5 according to the present modification is used for the image enhancing process at Step S7.

The above exemplified embodiments can be mutually combined. For example, the image processing method is thought of in which Steps S1 to S4 according to the first exemplified embodiment, and the third exemplified embodiment or Steps S5 to S8 and S10 according to the modification of the third exemplified embodiment are combined with each other, and an image processing apparatus that performs the image processing method is possible.

In the above, the cases where an image processing target is a fingerprint image have been described, However, the image processing target may be another curved stripe pattern image such as a palmprint image.

In the above, the present invention has been described with reference to the exemplified embodiments. However, the present invention is not limited to any of the above exemplified embodiments. Various modifications can be made to the above exemplified embodiments.

This application claims a priority based on Japanese patent application No. JP 2010-010348 filed on Jan. 20, 2010, and the disclosure thereof is incorporated herein by reference.

The invention claimed is:

1. An image processing apparatus comprising:
a data storage section configured to store image data as a density image containing a fingerprint or a palm print and ridge pattern direction distribution data which shows a direction distribution of a ridge pattern of the fingerprint or the palm print;
a direction usage image enhancing section configured to execute ridge direction usage image enhancement processing on the density image based on the ridge pattern direction distribution data; and
a direction extracting section configured to extract a first direction distribution of a first pattern which is contained in a ridge direction usage image enhanced image, from the ridge direction usage image enhanced image as a result of the ridge direction usage image enhancement processing to the density image,
wherein said direction usage image enhancing section executes first direction usage image enhancement processing on the density image based on first direction distribution data which shows the extracted first direction distribution,
and wherein the image processing apparatus further comprises a direction correcting section configured to correct the first direction distribution data based on the ridge pattern direction distribution data to generate corrected first direction distribution data,
wherein the ridge pattern direction distribution data relates a position in the density image and a ridge direction as a direction of a ridge pattern in the position,
wherein the first direction distribution data relates a first position corresponding to the position in the ridge direction usage image enhanced image and a first direction as a direction of the first pattern at the first position,
wherein when a difference between the ridge direction and the first direction is within a predetermined range, said direction correcting section generates the corrected first direction distribution data by replacing the first direction with an orthogonal direction to the ridge direction, and
wherein the first direction usage image enhancement processing is based on the corrected first direction distribution data.

2. The image processing apparatus according to claim 1, wherein said direction extracting section extracts a second direction distribution of a second pattern which is contained in a first direction usage image enhanced image, from the first direction usage image enhanced image as a result of executed the first direction usage image enhancement processing to the density image, wherein said direction correcting section corrects second direction distribution data which shows the second direction distribution, based on the ridge pattern direction distribution data to generate corrected second direction distribution data, and wherein said direction usage image enhancing section executes second direction usage image enhancement processing to the first direction usage image enhanced image based on the corrected second direction distribution data.

3. The image processing apparatus according to claim 1, wherein said direction extracting section detects a plurality of continuous pixel lines which include a first pixel of the ridge direction usage image enhanced image and extend into a plurality of predetermined directions, respectively, such that any pixel contained in the plurality of continuous pixel lines has a density value equal to or higher than a predetermined threshold value, and adopts a direction of one of the plurality of continuous pixel lines which has the largest number of pixels, as a first pattern direction at a position of the first pixel, and wherein the first direction distribution data relates the position of the first pixel and the first pattern direction.

4. The image processing apparatus according to claim 1, wherein the ridge pattern direction distribution data relates a density image position as a position of a density image pixel of the density image and a ridge pattern direction as a direction of the ridge pattern at the density image position, wherein the direction usage image enhancing section determines a first reference region as a local region which contains the density image pixel, based on the ridge pattern direction, and calculates a density value corresponding to the density image pixel in the ridge direction usage image enhanced image of the density image based on a first density histogram in the first reference region, wherein the first direction distribution data relates an ridge direction usage image enhanced image position as a position of an ridge direction usage image enhanced image pixel in the ridge direction usage image enhanced image and a first pattern direction as the direction of the first pattern in the ridge direction usage image enhanced image position, wherein the ridge direction usage image enhanced image position and the density image position correspond to each other, wherein the direction usage image enhancing section determines a second reference region as a local region which contains the density image pixel, based on the first pattern direction, and calculates a density value corresponding to the density image pixel in the first direction usage image enhanced image of the density image based on a second density histogram of the second reference region.

5. The image processing apparatus according to claim 1, further comprising:

a representative line data generating section configured to generate representative line data which shows a representative line of the ridge pattern based on an input operation by an operator; and a direction estimating section configured to generate ridge pattern direction distribution data based on the representative line data.

6. An image processing method comprising:

executing ridge direction usage image enhancement processing which is based on ridge pattern direction distribution data, to a density image based on image data of the density image which contains a fingerprint or a palm print and the ridge pattern direction distribution data which shows a direction distribution of a ridge pattern of the fingerprint or the palm print;

extracting a first direction distribution of a first pattern which is contained in a ridge direction usage image enhanced image, from the ridge direction usage image enhanced image as a result of ridge direction usage image enhancement processing to the density image; and executing first direction usage image enhancement processing which is based on first direction distribution data which shows the extracted first direction distribution, to the density image; and generating corrected first direction distribution data by correcting the first direction distribution data based on the ridge pattern direction distribution data, wherein the ridge pattern direction distribution data relates a position in the density image and a ridge direction as a direction of a ridge pattern in the position, wherein the first direction distribution data relates a first position corresponding to the position in the ridge direction usage image enhanced image and a first direction as a direction of the first pattern at the first position, wherein said generating corrected first direction distribution data comprises:

generating the corrected first direction distribution data by replacing the first direction with an orthogonal direction to the ridge direction, when a difference between the ridge direction and the first direction is within a predetermined range, and wherein the first direction usage image enhancement processing is based on the corrected first direction distribution data.

7. The image processing method according to claim 6, further comprising:

extracting a second direction distribution of a second pattern which is contained in a first direction usage image enhanced image, from the first direction usage image enhanced image as a result of executed the first direction usage image enhancement processing to the density image;

generating corrected second direction distribution data by correcting second direction distribution data which shows the second direction distribution, based on the ridge pattern direction distribution data; and executing second direction usage image enhancement processing to the first direction usage image enhanced image based on the corrected second direction distribution data.

8. The image processing method according to claim 6, wherein said extracting a first direction distribution comprises:

detecting a plurality of continuous pixel lines which include a first pixel of the ridge direction usage image enhanced image and extend into a plurality of predetermined directions, respectively, such that any pixel contained in the plurality of continuous pixel lines has a density value equal to or higher than a predetermined threshold value; and adopting a direction of one of the plurality of continuous pixel lines which has the largest number of pixels, as a first pattern direction at a position of the first pixel, and wherein the first direction distribution data relates the position of the first pixel and the first pattern direction.

9. The image processing method according to claim 6, wherein the ridge pattern direction distribution data relates a density image position as a position of a density image pixel of the density image and a ridge pattern direction as a direction of the ridge pattern at the density image position,
- wherein said executing ridge direction usage image enhancement processing to a density image, comprises:
- determining a first reference region as a local region which contains the density image pixel, based on the ridge pattern direction; and
- calculating a density value corresponding to the density image pixel in the ridge direction usage image enhanced image of the density image based on a first density histogram in the first reference region,
- wherein the first direction distribution data relates a ridge direction usage image enhanced image position as a position of a ridge direction usage image enhanced image pixel in the ridge direction usage image enhanced image and a first pattern direction as a direction of the first pattern in the ridge direction usage image enhanced image position,
- wherein the ridge direction usage image enhanced image position and the density image position correspond to each other,
- wherein said executing the first direction usage image enhancement processing to the density image, comprises:
- determining a second reference region as a local region which contains the density image pixel based on the first pattern direction; and
- calculating a density value corresponding to the density image pixel in the first direction usage image enhanced image based on a second density histogram in the second reference region.

10. The image processing method according to claim 6, further comprising:
- generating representative line data which shows a representative line of the ridge pattern based on an input operation by an operator; and
- generating ridge pattern direction distribution data based on the representative line data.

11. A non-transitory computer-readable recording medium which stores a computer-executable program code to attain a image processing method which comprises:
- executing ridge direction usage image enhancement processing which is based on ridge pattern direction distribution data, to a density image based on image data of the density image which contains a fingerprint or a palm print and the ridge pattern direction distribution data which shows a direction distribution of a ridge pattern of the fingerprint or the palm print;
- extracting a first direction distribution of a first pattern which is contained in a ridge direction usage image enhanced image, from the ridge direction usage image enhanced image as a result of ridge direction usage image enhancement processing to the density image; and
- executing first direction usage image enhancement processing which is based on first direction distribution data which shows the extracted first direction distribution, to the density image; and
- generating corrected first direction distribution data by correcting the first direction distribution data based on the ridge pattern direction distribution data,
- wherein the ridge pattern direction distribution data relates a position in the density image and a ridge direction as a direction of a ridge pattern in the position,
- wherein the first direction distribution data relates a first position corresponding to the position in the ridge direction usage image enhanced image and a first direction as a direction of the first pattern at the first position,
- wherein said generating corrected first direction distribution data comprises:
- generating the corrected first direction distribution data by replacing the first direction with an orthogonal direction to the ridge direction, when a difference between the ridge direction and the first direction is within a predetermined range, and
- wherein the first direction usage image enhancement processing is based on the corrected first direction distribution data.

* * * * *